United States Patent [19]

Boyer

[11] Patent Number: 4,469,375

[45] Date of Patent: Sep. 4, 1984

[54] TAUMEL HINGE RECLINER

[75] Inventor: Daniel R. Boyer, Gainesville, Fla.

[73] Assignee: Keiper U.S.A., Inc., Battle Creek, Mich.

[21] Appl. No.: 324,765

[22] Filed: Nov. 25, 1981

[51] Int. Cl.³ .............................................. A47C 1/25
[52] U.S. Cl. ..................................... 297/362; 74/805
[58] Field of Search .............. 297/362, 330, 354, 355; 74/804, 805; 16/354, 239, 319

[56] References Cited

U.S. PATENT DOCUMENTS

| | | | |
|---|---|---|---|
| 3,401,979 | 9/1968 | Putsch | 297/362 |
| 3,423,785 | 1/1969 | Pickles | 297/362 X |
| 3,972,563 | 8/1976 | Gustafsson | 297/362 |
| 4,113,308 | 9/1978 | Werner et al. | 297/362 |
| 4,147,386 | 4/1979 | Stolper | 297/362 |
| 4,195,881 | 4/1980 | Kluting et al. | 297/362 X |
| 4,196,931 | 4/1980 | Werner | 297/362 |
| 4,366,983 | 1/1983 | Klueting et al. | 297/362 |

Primary Examiner—William E. Lyddane

[57] ABSTRACT

Power hinge recliners for vehicle seat backs wherein sandwich taumel gearing provides high rigidity and torque capacity for accommodating power adjustment under occupant back pressure loads and including gravity release inertia latch back rest retention. Optional dual power actuated master and slave hinge construction is included.

16 Claims, 12 Drawing Figures

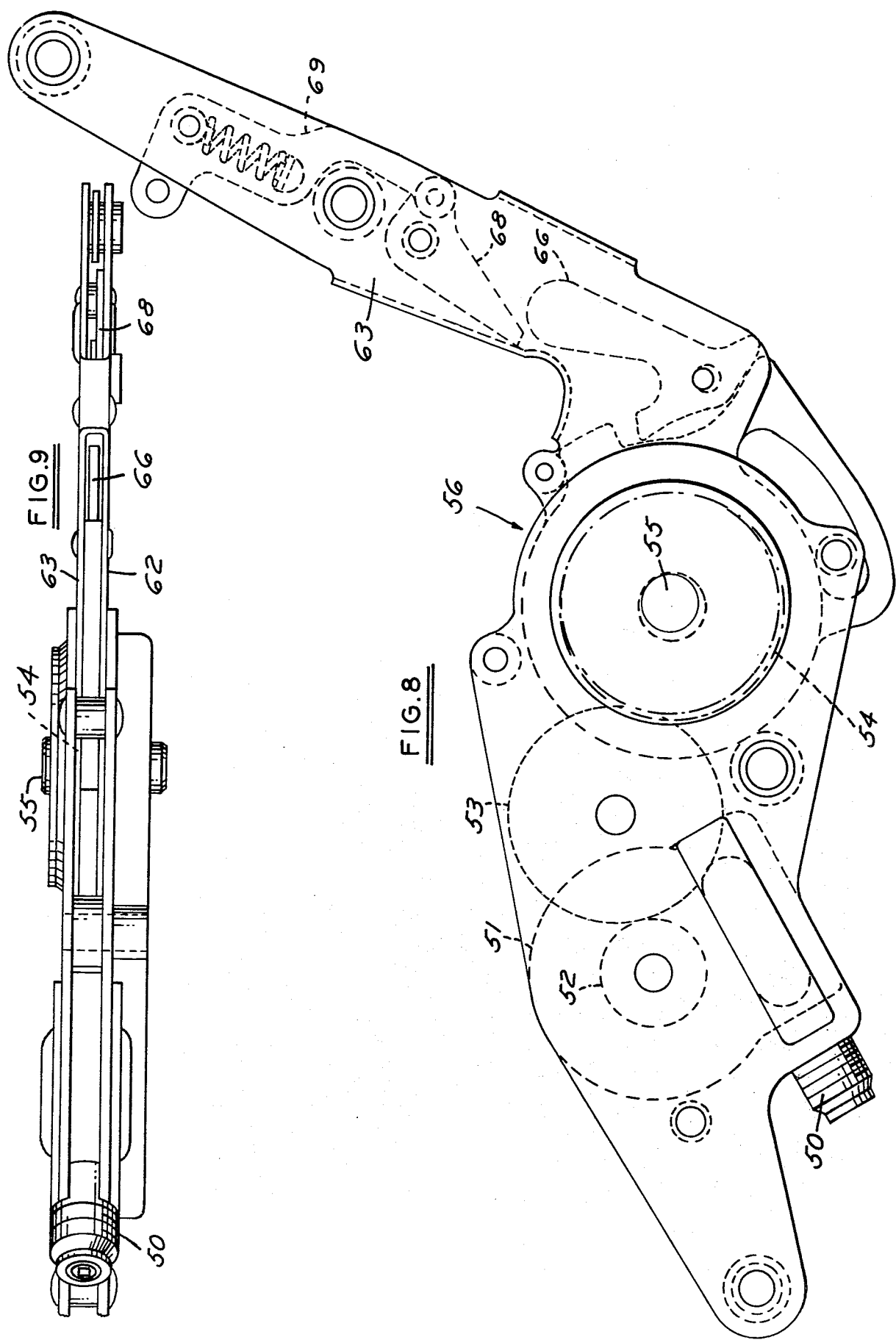

TAUMEL HINGE RECLINER

BACKGROUND OF THE INVENTION

Taumel gearing for manually adjusted hinge recliners employing single interengaging spur and ring gear elements are known in the art as disclosed in U.S. Pat. No. 3,401,979. Such hinges with manually actuated adjustment are not subject to high torque loading during adjustment since back pressure is normally relieved by the occupant in order to reduce manual torque applied to the adjustment knob. Accordingly, lateral separating forces and relative deflection of the taumel elements during adjustment is not a problem with the prior art manual taumel units. However, when such units are adapted with power drive of the taumel cam, the occupant may adjust the seat back inclination with his full back pressure applied which, particularly in the case of raising the back rest from a reclined position, may overload the taumel gearing having single taumel spur and ring gear elements.

The closest known prior art German Pat. No. 2,734,565, (U.S. Pat. No. 4,196,931) employs a manually actuated taumel cam for a seat bracket having no provision for forward dumping of the seat back and wherein sandwich taumel gearing drive between the bracket elements is effected through pin projections of a pair of spur gears through oversized bore holes in a bracket element accommodating eccentric displacement of the taumel spur gears. Additional background prior art includes West German Pat. Nos. 2,724,637, 2,733,488 and 2,808,889.

SUMMARY OF THE INVENTION

Power taumel recliners of the present invention incorporate sandwich taumel spur gears rigidly assembled to a central intermediate plate. The spur gears engage sandwich taumel ring gears formed as integral extensions of lower seat bracket elements. The intermediate plate is rotationally connected by inertia latch to a pair of upper seat back bracket elements piloted on a pivot pin having an eccentric cam which actuates the spur gears into taumel gear engagement with the sandwich ring gears. A power actuated worm and worm wheel for driving the eccentric cam is housed in fixed relation to the lower seat bracket elements so that the spur gears actuated by the cam cause adjustment in the angular relation of the intermediate plate and seat back bracket elements which gyrate slightly due to the eccentric throw of the cam during power adjustment. The sandwich construction provides balanced tooth loads between the sandwich spur and sandwich ring gears with adequate strength to effect upward adjustment of the seat back from a reclined position even with full occupant weight against the seat back.

In an alternate construction the upper seat back bracket elements are piloted on spur gear perimeters instead of the actuating cam and the power worm drive operates through intermediate reduction gears to drive a spur gear connected to the actuating eccentric cam and a cross drive extends between the pivot pin of a master bracket assembly on one side of the seat to the pivot pin of a slave taumel gear bracket assembly on the other side. With such arrangement the actuating load on the taumel gearing is effectively shared by the two bracket assemblies further increasing the combined capacity of the sandwich taumel gearing construction.

BRIEF DESCRIPTION OF THE DRAWINGS

FIG. 8 is a side elevation of an alternative construction;

FIG. 9 is a bottom view of the alternative construction shown in FIG. 8;

DETAILED DESCRIPTION OF TWO EMBODIMENTS

Figure 1:
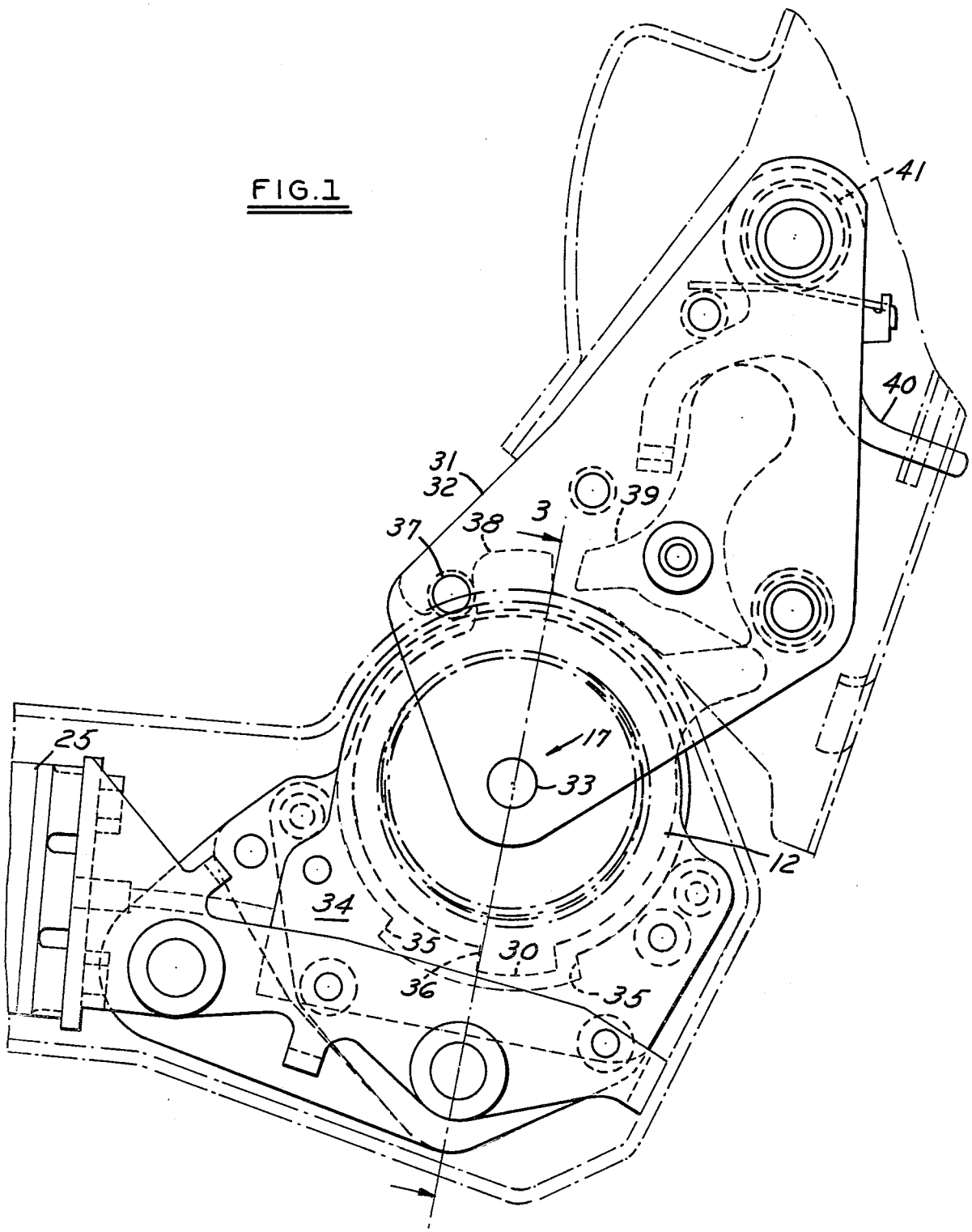
FIG. 1 is a fragmentary side elevation of a power taumel recliner assembly in accordance with the present invention.
Figure 2:
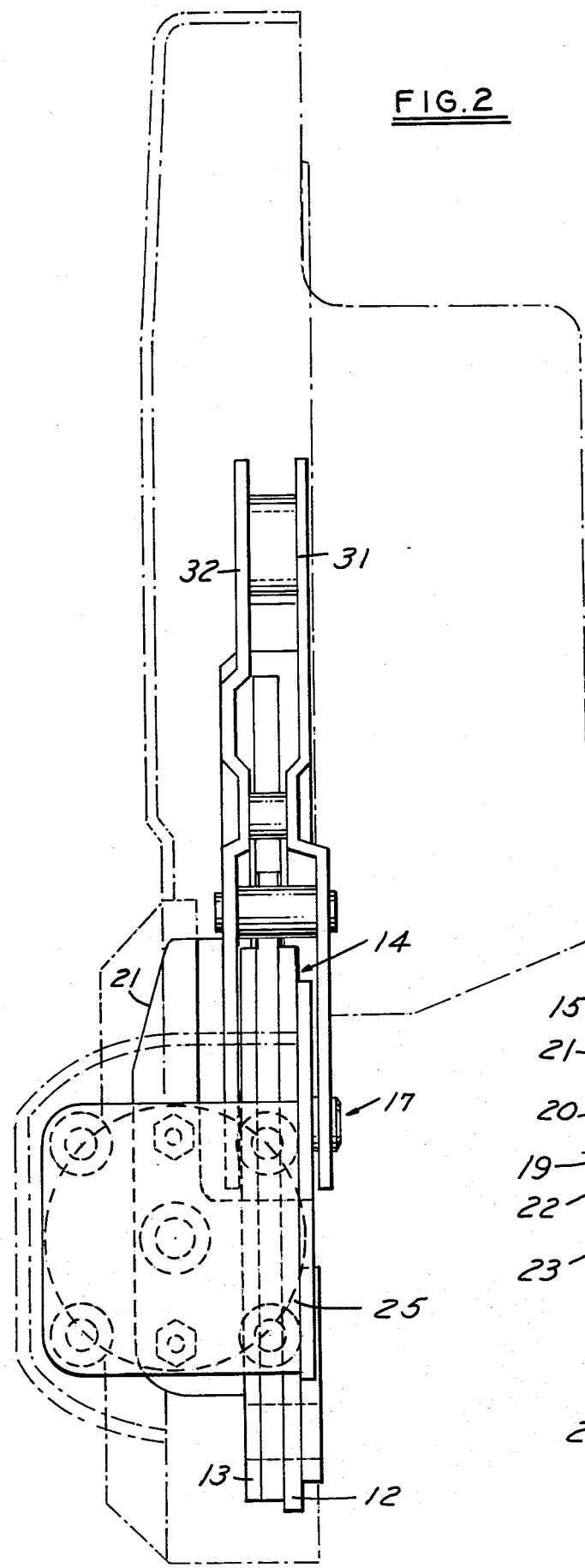
FIG. 2 is an end elevation of the recliner assembly shown in FIG. 1.
Figure 3:
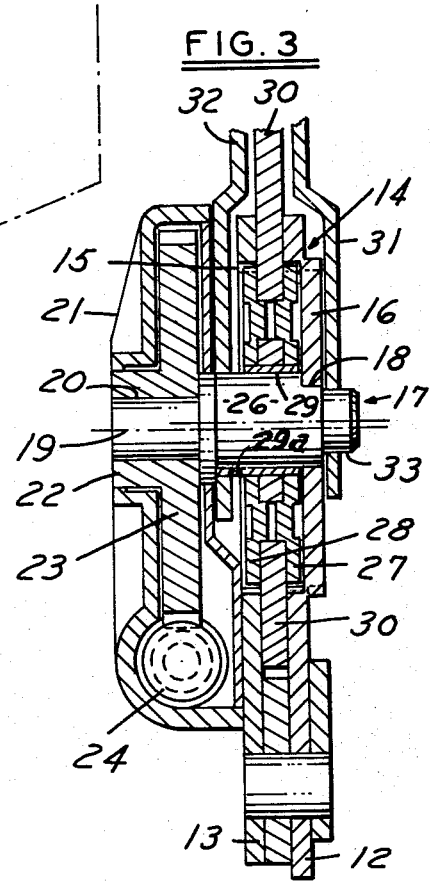
FIG. 3 is a fragmentary sectional view taken along the line 3—3 of FIG. 1.
Figure 4:
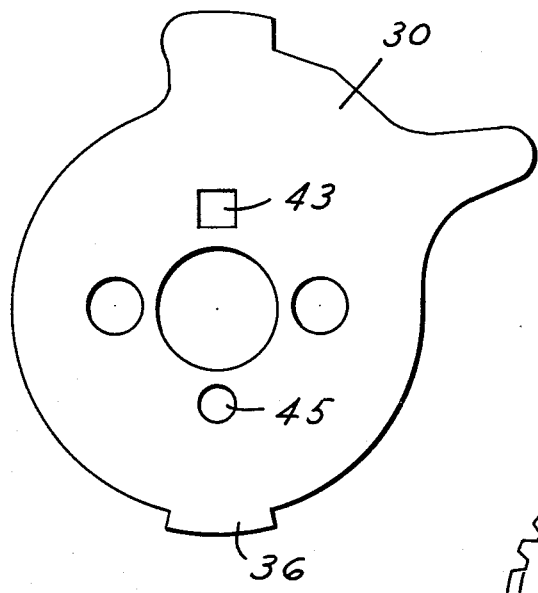
FIG. 4 is a side elevation of the intermediate plate which is rigidly attached between sandwich spur gears.
Figure 5:
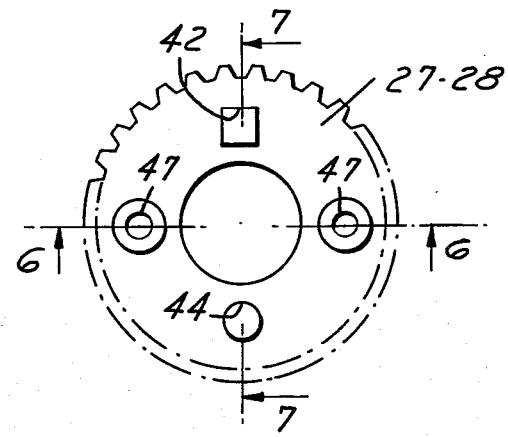
FIG. 5 is a face view of one of the spur gears.
Figure 7:
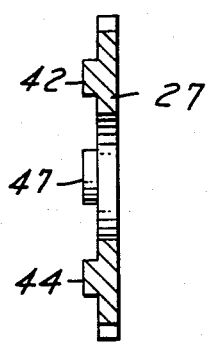
FIG. 7 is a sectional view taken along the line 7—7 of FIG. 5.
Figure 6:
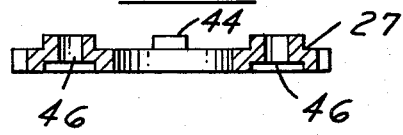
FIG. 6 is a sectional view taken along the line 6—6 of FIG. 5.

With reference to the first embodiment shown in FIGS. 1 to 7 inner and outer lower hinge bracket elements 12 and 13 are formed at their upper ends with taumel ring gears 14 and 15. Ring gear 14 is connected through integral portion 16 to eccentric pin 17 through shoulder 18 forming a pivotal bearing on main axis 19 of the eccentric pin. Outboard stem 20 of eccentric pin 17 is piloted within gear housing 21, which is rigidly assembled to the lower seat brackets, through hub 22 of worm wheel 23 drivingly connected to stem 20. Worm wheel 23 is driven through worm 24 by electric motor 25 serving to rotate eccentric cam 26 on which inner and outer sandwich spur gears 27 and 28 are mounted with bushing 29. As an alternative shown at 29a the bushing may extend to a fixed engagement with outer upper bracket 32. Taumel spur gears 27 and 28 are rigidly connected to intermediate plate 30 as hereafter described in detail and engage taumel sandwich ring gears 14 and 15 to provide taumel gear progression of spur gears relative to ring gears one tooth at a time per revolution of cam 26 thereby adjusting the position of intermediate plate 30 relative to lower bracket elements 12 and 13. Inner and outer upper bracket elements 31 and 32 adapted for connection to the seat back of a vehicle are piloted respectively on reduced cam 33 and cam 26 each having synchronized equal eccentric throws so that bracket elements 31, 32 and intermediate plate 30 gyrate together during adjustment.

As shown in FIG. 1 intermediate plate is adjustable relative to spacer plate 34 secured between lower bracket elements 12 and 13 within extremities between shoulders 35 engageable by intermediate plate projection 36. Rearward extremity of upper seat back brackets 31 and 32 relative to intermediate plate 30 is established by cross pin 37 engagement with intermediate plate projection 38 and forward dumping of upper bracket elements 31 and 32 is accommodated by inertia latch 39 through gravity actuation in the absence of excessive vehicle deceleration which will retain the latch in its engagement attitude relative to projection 38. Manual release of inertia latch 39 may be accomplished by release lever 40 pivotally connected to upper bracket elements 31 and 32 at 41.

Figure 11:
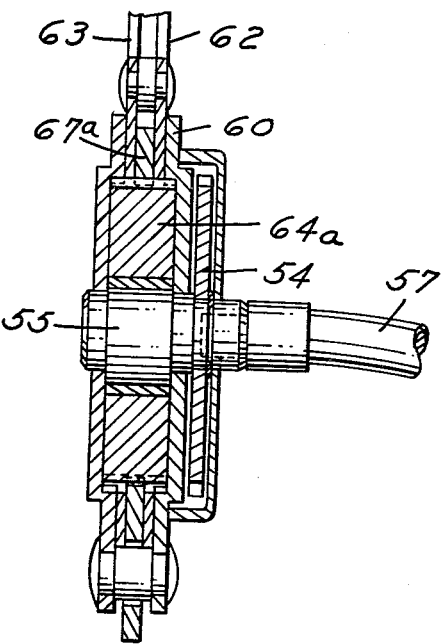
FIG. 11 is an alternative modification of spur gear and intermediate plate subassembly.

With reference to FIGS. 3 to 7 inner and outer spur gears 27 and 28 are constructed as identical parts from the same fine blanking dies having opposed square projections 42 closely fitting within square aperture 43 in intermediate plate 30 and round projections 44 within round aperture 45 and are rigidly assembled to intermediate plate 30 by a pair of rivets passing through apertures 46 in projecting bosses 47 thereby assuring matching alignment of identical spur gear teeth relative to each other when assembled. FIG. 11 illustrates an alternative single spur gear 64a extending through an intermediate plate 67a.

With reference to FIG. 8 an alternate form of power worm gear drive 50, 51 through reduction spur gears 52 and 53 to inwardly mounted eccentric drive gear 54 is adapted to drive eccentric pin 55 of the power driven master recliner assembly 56 connected by flexible drive 57 to slave eccentric pin 58 for recliner assembly 59. In this case inner and outer taumel ring gear elements 60 and 61 provide spaced pilot journal bearings for eccentric pin 55 and upper bracket elements 62 and 63 are piloted on the external perimeter of the taumel spur gears 64 and 65 thereby providing compactness of lateral space relative to the assembly of the first embodiment. A somewhat modified inertia latch 66 functions in a similar manner to the first embodiment relative to intermediate plate 67 and a modified manual release lever 68 is actuated through spring biased linkage 69.

Figure 10:
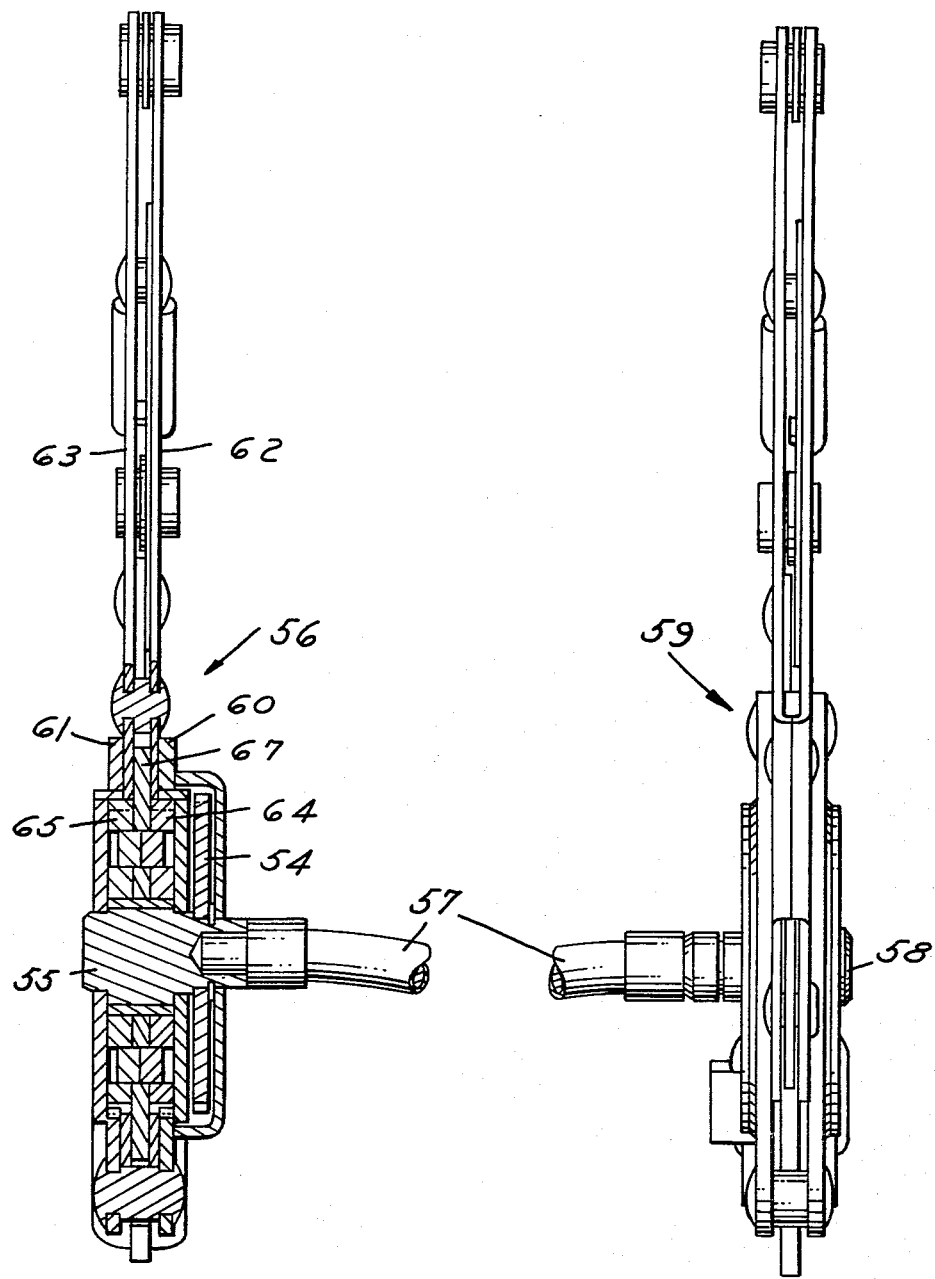
FIG. 10 is a sectional view taken along the line 10—10 of FIG. 8.
Figure 12:
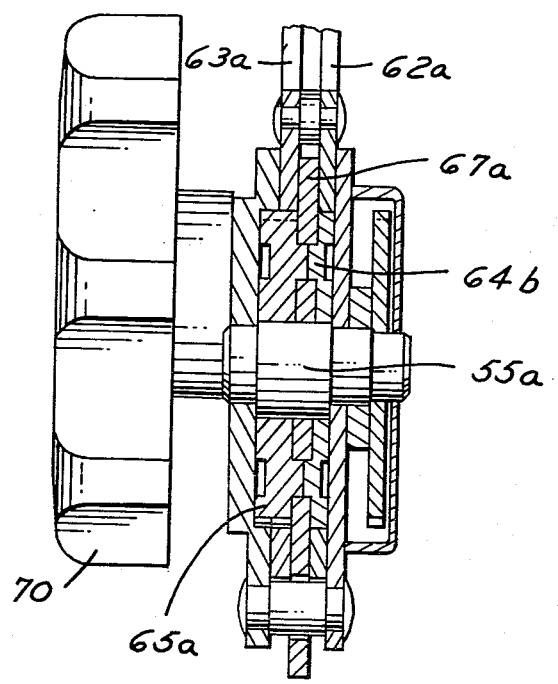
FIG. 12 is an alternative modification of the construction shown in FIG. 10 adapted for single side hinge and manual actuation.

With reference to FIG. 12 illustrating a single side manually actuated modification of the embodiment illustrated in FIG. 10, somewhat heavier upper bracket elements 62a and 63a are employed to accommodate total seat back loading applied to a single hinge. A manual knob 70 takes the place of power drive 50 and, in view of the lighter gear loading, single spur gear 65a may be combined with washer 64b to provide sandwich engagement with intermediate plate 67a. In this case of manual actuation no bushing is employed on eccentric pin 55a in order to assure self-locking of the taumel gearing which might be marginal with a low friction bushing.

I claim:

1. Adjustable seat back hinge comprising seat and seat back bracket means, eccentric pin means pivotally connecting in eccentric relation said respective bracket means, sandwich taumel spur and ring gear means pivotally connected in eccentric relation and actuated to provide taumel relative progression of said spur and ring gear means by rotation of said eccentric pin means, and means including spur and ring gear elements of said gear means to adjust relative operative positioning of said seat and seat back bracket means, said spur gear means having positioning connection to said seat back bracket means, said connection including an intermediate plate and releasable latch means, said spur gear means comprising a pair of identical spur gear elements interengaging single relative position locating apertures in said intermediate plate.

2. The hinge of claim 1 including power actuated means for rotating said eccentric pin means.

3. The hinge of claim 1 including worm and worm wheel power actuated means for rotating said eccentric pin means.

4. The hinge of claim 1 including worm, worm wheel and reduction spur gear power actuated means for rotating said eccentric pin means.

5. The hinge of claim 2, 3 or 4 including a similarly constructed slave adjustable seat back hinge having a driving connection from said power driven eccentric pin means to the corresponding slave eccentric pin means.

6. The hinge of claim 2, 3 or 4 wherein said positioning connection to said seat back bracket means includes an intermediate plate, and rotationally interengaging means between said intermediate plate and seat back bracket means including releasable latch means for accommodating forward dumping of said seat back.

7. The hinge of claim 6 including gravity actuated latch release means inertially actuated to retain latch attitude in response to vehicle deceleration.

8. The hinge of claim 1 wherein said taumel gear means includes sandwich ring gear elements having said positioning connection fixed to said seat bracket means.

9. The hinge of claim 8 wherein said seat bracket means comprise sandwich elements having integral taumel ring gears formed at their ends.

10. The latch of claim 1 including sandwich spur gears rigidly connected to either side of said intermediate plate.

11. The hinge of claim 1 wherein said seat back bracket means comprise sandwich elements spanning said intermediate plate and having bearing engagement with the outer perimeter of said spur gear means.

12. The hinge of claim 11 wherein said taumel gear means comprises a single spur gear engaging a single ring gear extends on one side of said intermediate plate, and washer means fixed to said spur gear extends on the other side of said intermediate plate, said sandwich elements of said bracket means having respective bearing engagement with the outer perimeter of said single spur gear and said washer means.

13. The hinge of claim 11 including low friction bushing means interposed between said spur gear means and said eccentric pin means.

14. The hinge of claim 11 including low friction bushing means interposed between said spur gear means and said eccentric pin means and wherein said bushing means extends to a fixed connection with one of said seat back bracket sandwich elements.

15. The hinge of claim 1 including low friction bushing means interposed between said spur gear means and said eccentric pin means.

16. Adjustable seat back hinge comprising seat and seat back bracket means, eccentric pin means pivotally connecting in eccentric relation said respective bracket means, sandwich taumel spur and ring gear means pivotally connected in eccentric relation and actuated to provide taumel relative progression of said spur and ring gear means by rotation of said eccentric pin means, and means including spur and ring gear elements of said gear means to adjust relative operative positioning of said seat and seat back bracket means, said spur gear means having positioning connection to said seat back bracket means, said connection including an intermediate plate and releasable latch means, said spur gear means comprising a single spur gear element extending through said intermediate plate.

* * * * *